J. LEND.
ARMORED PNEUMATIC TIRE.
APPLICATION FILED NOV. 24, 1909.
1,039,063.
Patented Sept. 17, 1912.
2 SHEETS—SHEET 1.
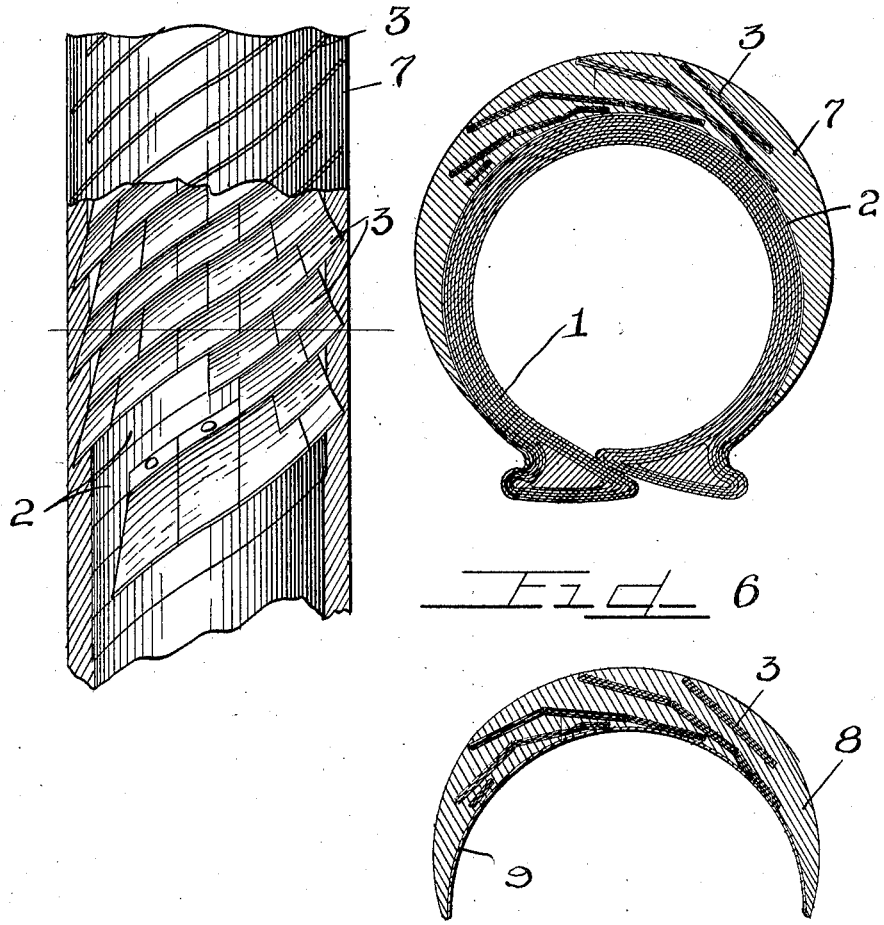

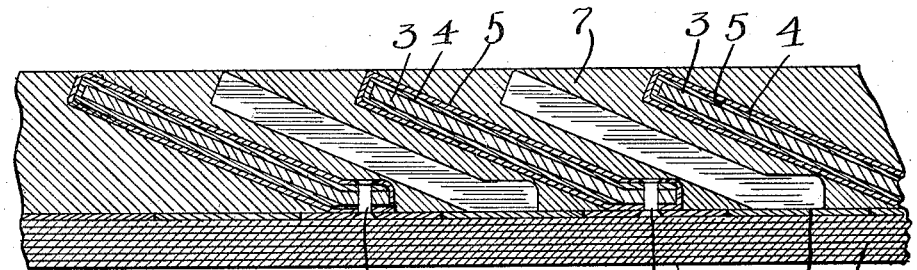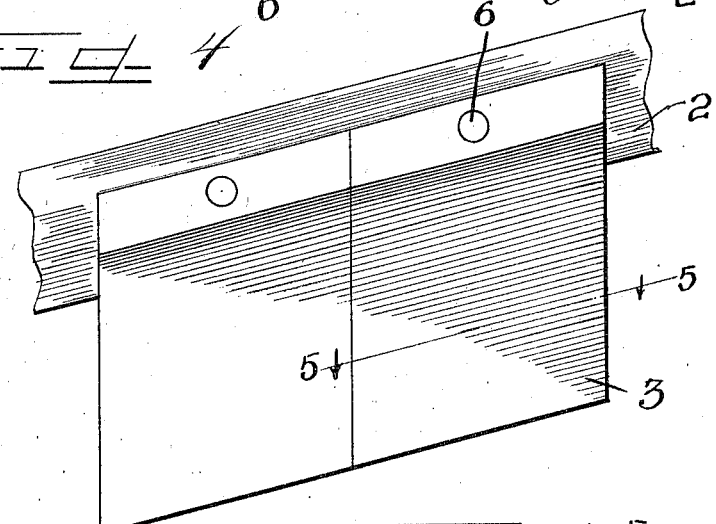

UNITED STATES PATENT OFFICE.

JOHN LEND, OF CHICAGO, ILLINOIS, ASSIGNOR, BY MESNE ASSIGNMENTS, TO SANFORD C. McKNIGHT, OF CHICAGO, ILLINOIS.

ARMORED PNEUMATIC TIRE.

1,039,063.  Specification of Letters Patent.  Patented Sept. 17, 1912.

Application filed November 24, 1909. Serial No. 529,803.

*To all whom it may concern:*

Be it known that I, JOHN LEND, a citizen of the United States, and a resident of the city of Chicago, in the county of Cook and State of Illinois, have invented certain new and useful Improvements in Armored Pneumatic Tires; and I do hereby declare that the following is a full, clear, and exact description of the same, reference being had to the accompanying drawings, and to the numbers marked thereon, which form a part of this specification.

One of the most severe expenses and one of the most troublesome elements in the use of the automobile and the like is the pneumatic tire. These are short lived, and even though they may not be inferior in quality they are nevertheless likely to puncture frequently and to be subject to other troubles, causing great annoyance and loss of time as well as expense to the user. Many different devices have been constructed for the purpose of obviating these difficulties and with the view to bringing the tire construction to the same state of perfection attained by other elements forming the automobile. As a matter of fact, however, while the general construction of motor vehicles has reached a high degree of perfection, tire troubles are as frequent as ever and there has heretofore been no satisfactory method of obviating the same. Attempts have been frequently made to dispense with the use of rubber tires for this reason and resort has frequently been had to complicated spring constructions entailing other troubles as serious (if not more serious) than those the inventor was attempting to escape. Another serious objection to the use of pneumatic tires of rubber has been found in the fact than on asphalt pavements and on many other road materials such tires skid easily and many serious accidents have occurred thereby resulting very frequently in loss of life.

The object of this invention is to afford a non-skidding armored tire of the class described adapted for use for any purpose for which pneumatic tires have heretofore been employed.

It is also an object of this invention to afford an armored and non-skidding tire in which the construction is materially cheapened, and the life and service of the tire extended by the use in the composition or construction of the tire of inexpensive strengthening webs of reinforcing material so arranged as to prevent penetration of the casing by nails, glass or other substances so frequently the cause of puncture.

It is also an object of the invention to afford a construction adapted to greatly extend the life of the tire by affording in connection with the rubber a resisting material adapted greatly to prolong the life of the tire by removing the excessive wear from the rubber.

It is also an object of the invention to afford a reinforced and armored tire, the reinforcement for which serves to greatly strengthen the tire from blow-outs.

The invention consists in the matters hereinafter described and more fully pointed out and defined in the appended claims.

In the drawings: Figure 1 is a transverse section of a tire embodying my invention, showing one of the clencher type. Fig. 2 is a fragmentary sectional view partly in plan and showing part with the rubber omitted. Fig. 3 is an enlarged longitudinal section of the tread of the tire. Fig. 4 is an enlarged fragmentary detail of one of the reinforcing strips and armor plates. Fig. 5 is a section on line 5—5 of Fig. 4. Fig. 6 is a transverse section similar to Fig. 1, of a shoe adapted to be inserted in an ordinary tire casing, to render the same puncture proof.

As shown in the drawings: 1, indicates the canvas, lining the casing, as usual, and which, of course, may be of any desired ply thoroughly cemented together with rubber to afford the requisite strength. Secured spirally around said fabric forming said lining are reinforcing bands 2, also of strong canvas and on which are riveted plates of indurated fiber, indicated as a whole by 3, each of which is invested in strong canvas layers 4—5, impregnated with rubber to thoroughly cement the canvas thereto. Said fiber plates are shaped or formed before securing the same in place to incline obliquely and spirally outward, as shown in Figs. 1, 2 and 3, and with the edges thereof extending close to the outer surface or tread of the tire. The structure thus formed is then invested with rubber 7, vulcanized thereto as is usual to bind the structure together as a unit. The rivet 6, whereby the plates 2, may, if desired, be inserted through more than one of said bands and may be more than one in number for each plate, though this ordinarily is not necessary inasmuch as the rubber itself affords a very strong connection.

A tread or shoe 8, is shown in Fig. 6, in which is embedded the fiber plates 3, before described. Said plates are secured in place upon the reinforcing band 9, either by riveting or in any other suitable manner and a sufficient number thereof employed to afford an overlapping arrangement such as shown in Figs. 2 and 3, and the whole invested with rubber vulcanized as before.

The operation is as follows: Owing to the general construction and the additional amount of fabric employed in the tire, an exceedingly strong construction is assured. Also, owing to the overlapped arrangement of the fiber plates 3, in successive spiral bands around the tread of the tire, it follows that any obstruction encountered, although it may present sharp cutting points or edges, fails to cut or puncture the casing owing to the resisting effect of the fiber and canvas. Also, owing to the oblique arrangement of the fiber in the casing, any sharp pointed instrument is effectively turned. Owing to the overlapped arrangement of said plates it is obvious that any pointed object must at least penetrate two of said plates before the inner tube can be perforated. In consequence the protection against puncturing is exceedingly effective which will be readily understood when the resisting power of the fiber is considered. Inasmuch as the fiber plates extend to near the periphery of the tire at the tread, it follows that as the tread wears down, the fiber edges are constantly presented to the roadway, resisting such wear and what is very important, affording an oblique edge to the road to prevent skidding.

Of course, details of the construction may be varied. I therefore do not purpose limiting this application for patent otherwise than necessitated by the prior art.

I claim as my invention:

1. A tire casing having embedded therein obliquely directed, spirally arranged plates of puncture resisting material.

2. A tire casing having embedded therein overlapped spirally arranged, outwardly diverging plates of puncture resisting material.

3. A tire having overlapped spirally arranged resilient plates of puncture resisting material embedded therein and vulcanized in place, and inclined outwardly and peripherally of the tire.

4. A tire embracing an inner structure of canvas, an outer investment of rubber vulcanized thereto, and plates of puncture resisting material secured on the canvas and extending obliquely into the rubber and arranged in overlapped relation.

5. In a tire the combination with the canvas lining of fiber plates riveted thereto and extending obliquely and spirally into the rubber, said fiber plates being arranged in close relation in lines each overlapping another.

6. A tire embracing fabric lining material, a series of fiber layers comprising a plurality of obliquely and spirally arranged plates of fiber each invested in fabric and riveted and permanently secured to the fabric lining material, said plates extending obliquely outward to the periphery of the tread and a rubber investement wholly inclosing said plates and fabric and affording the tread.

7. A tire of the class described embracing spirally arranged, overlapped, canvas invested plates riveted to the canvas lining of the tire.

8. A tire of the class described embracing in combination with the canvas lining, reinforcing canvas strips vulcanized thereto, and obliquely and spirally arranged plates riveted to the reinforcing strips and projecting obliquely therefrom and extending spirally and in overlapped relation around the tread of the tire, and a rubber investment wholly inclosing said plates.

9. A reinforced tire comprising a lining, a tread of rubber vulcanized thereto and transverse lines of longitudinal overlapping strips inclined obliquely and spirally outward embedded in the rubber.

10. A tire comprising a lining, overlapping strips inclined obliquely and spirally outward and a layer of rubber investing the strips and attached to the lining.

11. A tire comprising a lining, a tread of strips secured thereto, and overlapping strips secured to said lining and inclined obliquely in the tread and extending to the periphery thereof.

12. A tire comprising a lining, a tread of rubber secured thereto, fiber strips in the tread extending to the periphery thereof arranged spirally and overlapping and fabric investing the strips.

13. A tire comprising a fabric lining, reinforcing bands secured spirally around the same from rim to rim, and spirally arranged plates of puncture resisting material secured to said bands and extending outwardly therefrom.

14. A tire comprising a fabric lining, a narrow closely arranged reinforcing band of fabric secured spirally around the same, a resilient tread investing said structure and plates secured to said reinforcing band and extending obliquely and spirally into said tread.

In testimony whereof I have hereunto subscribed my name in the presence of two subscribing witnesses.

JOHN LEND.

Witnesses:
K. E. HANNAH,
J. W. ANGEL.